(12) United States Patent
Rafiq et al.

(10) Patent No.: US 8,584,196 B2
(45) Date of Patent: Nov. 12, 2013

(54) TECHNIQUE FOR EFFICIENTLY EVALUATING A SECURITY POLICY

(75) Inventors: Mohammed Irfan Rafiq, Mountain View, CA (US); Sabina Petride, Menlo Park, CA (US); Sam Idicula, Mountain View, CA (US); Ashwini Surpur, Cupertino, CA (US); Nipun Agarwal, Santa Clara, CA (US); Bhushan Khaladkar, Mountain View, CA (US); Tim Wing Yu, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 907 days.

(21) Appl. No.: 12/114,915

(22) Filed: May 5, 2008

(65) Prior Publication Data

US 2009/0276824 A1 Nov. 5, 2009

(51) Int. Cl.
*G06F 21/00* (2013.01)
(52) U.S. Cl.
USPC .................................. 726/1; 726/26; 370/392
(58) Field of Classification Search
USPC ........................... 726/1, 26; 713/182; 709/228
See application file for complete search history.

(56) References Cited

U.S. PATENT DOCUMENTS

| | | | | |
|---|---|---|---|---|
| 7,325,074 | B2* | 1/2008 | McRae | 709/242 |
| 7,506,102 | B2* | 3/2009 | Lev-Ran et al. | 711/118 |
| 2006/0221967 | A1* | 10/2006 | Narayan et al. | 370/392 |
| 2006/0230282 | A1* | 10/2006 | Hausler | 713/182 |
| 2007/0124482 | A1* | 5/2007 | Lee et al. | 709/228 |
| 2007/0276835 | A1* | 11/2007 | Murthy | 707/9 |
| 2007/0283443 | A1* | 12/2007 | McPherson et al. | 726/26 |
| 2008/0162485 | A1* | 7/2008 | Long et al. | 707/9 |
| 2009/0164499 | A1* | 6/2009 | Samudrala et al. | 707/102 |

OTHER PUBLICATIONS

Munoz, "TPM-based protection for mobile agents", 2010, Security Comm. Networks, pp. 45-60.*

* cited by examiner

*Primary Examiner* — Taghi Arani
*Assistant Examiner* — Gregory Lane
(74) *Attorney, Agent, or Firm* — Shun Yao; Park, Vaughan, Fleming & Dowler LLP (57) ABSTRACT

One embodiment of the present invention provides a system for efficiently evaluating a security policy. During operation, the system retrieves one or more roles associated with the user. Next, the system checks if a session-level cache exists for a set of Access Control Entries (ACEs) which is associated with the one or more roles. If this session-level cache exists, the system returns the set of ACEs from the session-level cache. Otherwise, the system generates the set of ACEs associated with the one or more roles from an Access Control List (ACL). During operation, the system can also update the one or more roles associated with the user and update the set of ACEs based on the updated one or more roles and the ACL. The system subsequently updates the session level cache with the updated set of ACEs and updated one or more roles.

15 Claims, 6 Drawing Sheets

EMPLOYEE DATABASE 800

| NAME | TITLE | SALARY |
|---|---|---|
| AMY SMITH | MANAGER | $110,000 |
| DAN HANSEN | SOFTWARE ENGINEER | $80,000 |
| ROBERT JONES | JANITOR | $35,000 |
| NANCY GREEN | COMEDIAN | $150,000 |

ACCESS CONTROL ENTRY FOR A MANAGER ROLE 810

FIG. 8A

EMPLOYEE DATABASE 800

| NAME | TITLE | SALARY |
|---|---|---|
| AMY SMITH | MANAGER | $110,000 |
| DAN HANSEN | SOFTWARE ENGINEER | $80,000 |
| ROBERT JONES | JANITOR | $35,000 |
| NANCY GREEN | COMEDIAN | $150,000 |

ACCESS CONTROL ENTRY FOR AN EMPLOYEE ROLE 820

FIG. 8B

ACCESS CONTROL ENTRY FOR AMY SMITH 830

EMPLOYEE DATABASE 800

| NAME | TITLE | SALARY |
|---|---|---|
| AMY SMITH | MANAGER | $110,000 |
| DAN HANSEN | SOFTWARE ENGINEER | $80,000 |
| ROBERT JONES | JANITOR | $35,000 |
| NANCY GREEN | COMEDIAN | $150,000 |

FIG. 8C

```
<ACL>
<SECURITYCLASS>sc1
    <ACE>
        <GRANT>true
            <PRINCIPAL>role1
            <PRIVILEGES>
                <PRIV>read
                <PRIV>write
                <PRIV>execute
            </PRIVILEGES>
            </PRINCIPAL>
        </GRANT>
    </ACE>
    <ACE>
        <GRANT>true
            <PRINCIPAL>role2
            <PRIVILEGES>
                <PRIV>read
            </PRIVILEGES>
            </PRINCIPAL>
        </GRANT>
    </ACE>
</ACL>
```

XML ACCESS CONTROL LIST 900

TECHNIQUE FOR EFFICIENTLY EVALUATING A SECURITY POLICY

BACKGROUND

1. Field

The present disclosure relates generally to computer security. More specifically, the present disclosure relates to a technique for efficiently evaluating a security policy for a user's session.

2. Related Art

A user in a secure system typically logs onto a session, attempts several operations within that session, and then logs off the session. During these attempted operations, a security system can evaluate whether or not the operations are allowed in the session according to the roles associated with the user. This evaluation is called security policy evaluation. Typically, the system uses an Access Control List (ACL), which contains a set of Access Control Entries (ACEs). From the set of ACEs, security policy evaluation determines what privileges are granted or denied to a particular user. For example, an ACE might contain a privilege that represents that an employee can only execute a read operation on an object such as a database of employee records. However, extracting the set of ACEs associated with a user in an ACL is often a computationally expensive operation.

SUMMARY

One embodiment of the present invention provides a system for efficiently evaluating a security policy. During operation, the system retrieves one or more roles associated with the user. Next, the system checks if a session-level cache exists for a set of Access Control Entries (ACEs) which is associated with the one or more roles. If this session-level cache exists, the system returns the set of ACEs from the session-level cache. Otherwise, the system generates the set of ACEs associated with the one or more roles from an Access Control List (ACL). During operation, the system can also update the one or more roles associated with the user and update the set of ACEs based on the updated one or more roles and the ACL. The system subsequently updates the session level cache with the updated set of ACEs and updated one or more roles.

In some embodiments, retrieving the one or more roles associated with the user comprises retrieving a directed acyclic graph associated with the user.

In some embodiments, generating the set of ACEs associated with the one or more roles from the ACL involves retrieving an XML document representing an ACL, parsing the retrieved XML document, and generating the set of ACEs associated with the one or more roles from the parsed XML document.

In some embodiments, generating the set of ACEs that is associated with the one or more roles from the parsed XML document involves generating a set of privileges that are granted and associated with the one or more roles from the parsed XML document and generating a set of privileges that are denied and associated with the one or more roles from the parsed XML document.

In some embodiments, updating the one or more roles associated with the user involves at least one of a system administrator changing the one or more roles, a process temporarily enabling a role, and a role expiring because of a time limit.

In some embodiments, updating the set of ACEs based on the updated one or more roles and the ACL involves deleting the set of ACEs and generating a new set of ACEs associated with the one or more roles from the access control list.

In some embodiments, updating the session-level caches so that the updated set of ACEs is associated with the updated one or more roles involves storing a bit vector for a grant list associated with the set of ACEs so that the bit vector for the grant list is associated with the one or more roles, and storing a bit vector for a deny list associated with the set of ACEs so that the bit vector for the deny list is associated with the one or more roles.

DETAILED DESCRIPTION

The following description is presented to enable any user skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

Overview

Database servers typically implement access controls for the users of a database. This allows a database administrator to provide differential access to the database based on the user, the user's roles, the requested operation, and the data the user is requesting to access.

Specifically, a user might be associated with one or more roles. The roles can include the user as him or her self. Upon logging into a session, the system retrieves the user's one or more roles. Given the one or more roles, the user typically requests that operations be performed during a session. Performing these operations involves performing a security policy check using an Access Control List (ACL) and the one or more roles.

Note that a requested operation might be focused on an object such as a subset of a database or a function. Moreover, operation requests might involve a request for a read, write, delete, execute, or create. For example, a specific user such as "Amy Smith," whose role is a manager, might request a read access (requested operation) on a particular row (object) in an employee salary database. Unless "Amy Smith" is a manager, she cannot access the salary data of other users. However, all employees might be able to access the names of the employees and their titles. Additionally, a manager can execute all operations on the entire salary database (object). The permissions associated with these operations might be grant, deny, or unknown. The set of allowable (grantable) or deniable operations is also known as "privileges."

More generally, any process can in effect act as a user. Note that an object can also include a function that can be executed. This allows functions as well as data to be restricted and flexibly controlled.

An ACL is a list of Access Control Entries (ACEs), which specify a permission associated with a particular role and ACL. Typically, an ACL is object-oriented, which associates the ACL's list with an object such as a subset of a database or a function. However, an ACL can also be role-oriented, which associates an ACL's list with a role instead of an object. An ACL can also refer to a security class, which defines what privileges can be used in that ACL.

The set of ACEs can be represented in various ways. For example, an XML document representation of an ACL might encode the set of ACEs. In order to retrieve the set of ACEs associated with one or more roles, the system can parse the XML document and then generate the particular privileges associated with the set of roles. This XML-based process returns a set of ACEs.

The set of ACEs can also inherit privileges from an ancestor set of ACEs. For example, a child set of ACEs can inherit privileges from a parent set of ACEs. These privileges can be inherited through a constraining (conjunctive; AND) or an extending (disjunctive; OR) relationship or other functional relationships.

A security policy evaluation can involve generating a set of ACEs from an ACL given one or more roles. In turn, generating a set of ACEs from an ACL given one or more roles can involve computationally expensive parsing and generation operations. Efficiency of security policy evaluation can be improved by caching previously parsed and generated ACEs for the same one or more roles. More specifically, embodiments of the present invention can employ a caching process to efficiently evaluate a set of ACEs at the level of a user's session given one or more roles and ACL.

Overall System Operation

Figure 1:
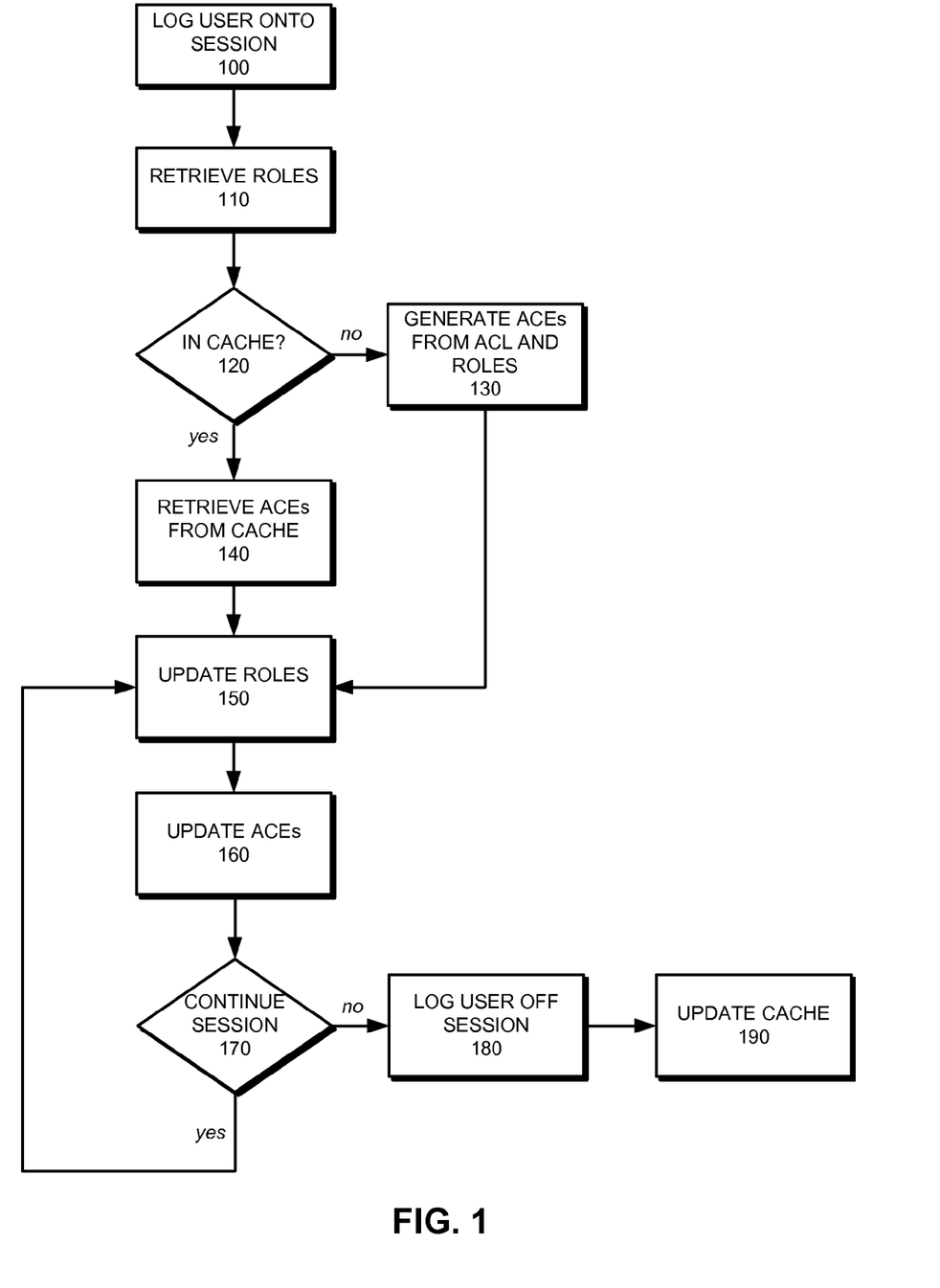
FIG. 1 presents an exemplary system for efficiently evaluating a security policy in accordance with the present invention.

FIG. 1 presents an exemplary system for efficiently evaluating a security policy in accordance with the present invention.

The system first logs the user onto a session (process 100) using a security-based protocol such as a username and password. Various other security-based protocols such as biometric methods or digital certificates could be used to log the user onto a session After a user logs onto a session, the system retrieves the one or more roles that are associated with the user (process 110). The one or more roles can include the user. Roles associated with the user prior to logging onto the session are referred to as "static" roles. Roles updated within a user session are referred to as "dynamic" roles. The system combines both static and dynamic roles during security policy evaluation.

After the system has retrieved the one or more roles associated with the user, the system checks if the set of ACEs is in the session-level cache and associated with the set of roles (decision 120). If the set of ACEs is in the session-level cache and is associated with the set of roles, the system retrieves the set of ACEs associated with the set of roles (process 140). Otherwise, the system generates the set of ACEs from an ACL (process 130). Note that each ACL can refer to a security class, which defines what privileges can be used in that ACL.

During operation, the system can also update the set of roles that are associated with a user (process 150) and update the ACEs given the updated set of roles and ACL.

The user can then continue operations (decision 170) or log off the session (process 180). Decision 170 reflects the idea that a user may desire several operations during a session. The user typically attempts various operations during a session; these are not shown in FIG. 1. However, these operations can involve a security policy evaluation against the set of ACEs—as generated, retrieved, or updated.

Once the user logs off the session, the system updates the session-level cache so that the set of ACEs is associated with the one or more roles (process 190). Note that multiple users can overwrite the session-level cache in sequence. The current session-level cache is associated with the most recent write.

A User's Role Graph

Figure 2:
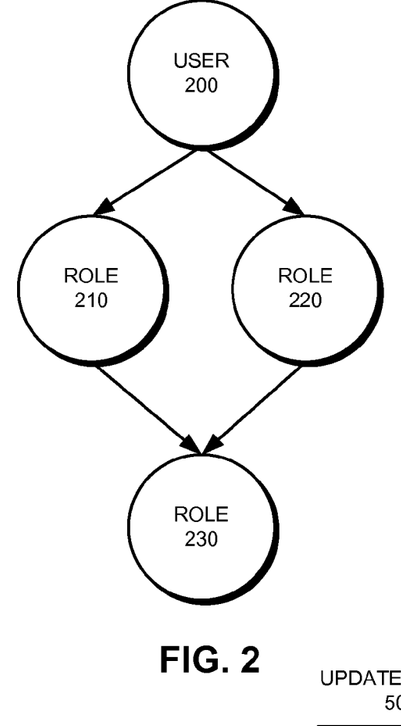
FIG. 2 illustrates an association between a user and a one or more roles where the association is represented as a directed acyclic graph.

FIG. 2 illustrates an association between a user and the one or more roles represented as a directed acyclic graph. For example, "Amy Smith" might be a manager-level employee, which is at the executive-level, which is at the co-owner-level of the company. A user (User 200) can also appear in a role as himself or herself. For example, "Amy Smith" might have the role of Amy Smith. One way to represent the one or more roles (Role 210-Role 230) is through a directed acyclic graph known as a "role graph" and shown in FIG. 2. Various other data structures can be used to represent the one or more roles.

Retrieving the Set of ACEs

Figure 3:
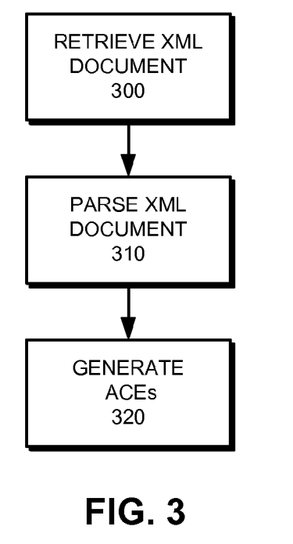
FIG. 3 presents an exemplary process for generating from the ACL the set of ACEs associated with the one or more roles.

FIG. 3 presents an exemplary process for retrieving from the ACL the set of ACEs associated with the one or more roles. During this process, the system first retrieves an XML document associated (process 300) with the ACL. Next the system parses the retrieved XML document (process 310). Finally, the system generates the set of ACEs associated with the one or more roles and the parsed XML document (process 320).

Generating the Set of ACEs with Privileges Granted and Denied

Figure 4:
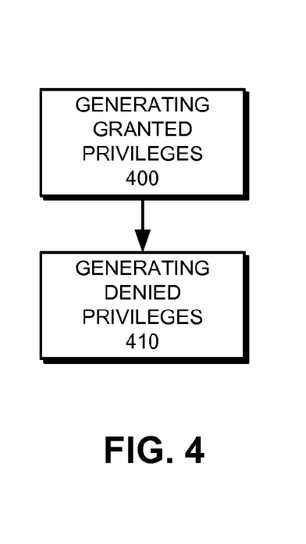
FIG. 4 presents an exemplary process for generating the set of ACEs associated with the one or more roles from the parsed XML document.

FIG. 4 presents an exemplary process for generating the set of ACEs associated with the one or more roles from the parsed XML document. During this process, the system generates the set of granted privileges (process 400) and the set of denied privileges (process 410). These two sets, combined, represent the set of ACEs. Various representation methods other than grant and deny sets can also be used.

Dynamic Roles

Figure 5:
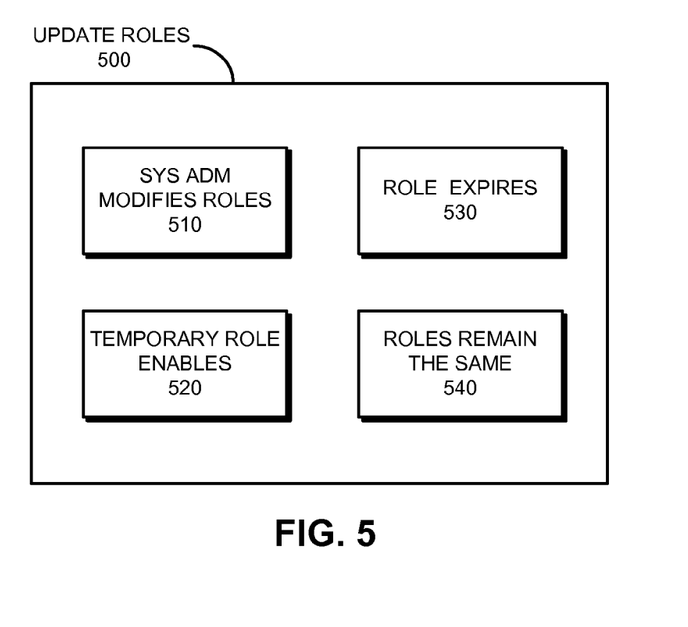
FIG. 5 presents an exemplary process of updating the one or more roles associated with the user that involves at least one of a system administrator changing the one or more roles, a process temporarily enabling a role, a role expiring because of a time limit, and the roles remaining the same.

FIG. 5 presents an exemplary process of updating the one or more roles (process 500) associated with the user that involves at least one of a system administrator changing the one or more roles (process 510), a process temporarily enabling a role (process 520), and a role expiring because of a time limit (process 530). Such roles are "dynamic" because they are enabled or disabled after a user has logged onto a session. FIG. 5 illustrates a way in which roles can dynamically change. For example, a system administrator can alter a role graph after a user has logged onto a session (process 510), a role can be temporarily enabled (process 520; e.g., a time-based view of material), one or more roles can expire because a time limit has been reached (process 530), or the one or more roles can remain the same (process 540). Various other conditions might enable or disable roles dynamically.

Note that in most cases, role changes will be infrequent. Thus the ACEs will not be frequently updated nor will the session-level cache be overwritten frequently. Infrequent role changes further adds to the efficiency of the present invention.

Updating the Session-Level Cache

Figure 6:
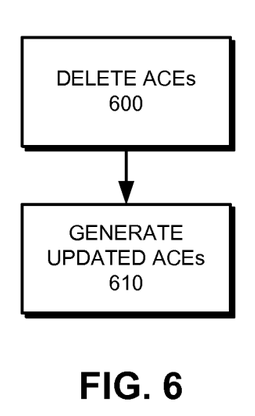
FIG. 6 presents an exemplary process for updating the session-level cache of the set of ACEs associated with the updated one or more roles and the ACL.

FIG. 6 presents an exemplary process for updating the set of ACEs associated with the one or more roles. During this process, the system first deletes the ACE associated with the one or more roles (process 600). Next, the system generates an updated set of ACEs from the ACL based on the updated one or more roles (process 610). The same method as in process 130 can be used to generate an updated set of ACEs from the ACL except here the generation can be based on the updated one or more roles.

Storing the Session-Level Cache with Bit Vectors

Figure 7:
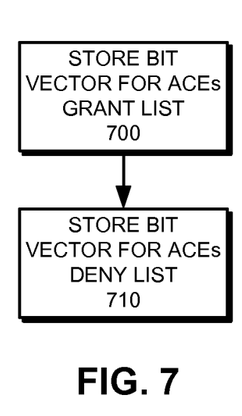
FIG. 7 presents an exemplary process for updating the session level cache.

FIG. 7 presents an exemplary process for updating the session-level cache so that the updated set of ACEs is associated with the updated one or more roles. During this process, the system stores bit vectors through two different processes. The first process (process 700) stores a bit vector that represents the grant list associated with the updated set of ACEs and the updated one or more roles. The second process (process 710) stores a bit vector that represents the deny list associated with the updated set of ACEs and the updated one or more roles. Note that both the grant and deny lists can be associated with the same set of ACEs. Thus an ACE can be associated with a grant list portion and a deny list portion.

The grant list is a list of privileges that are granted for the one or more roles. For example, a grant list might specify that a certain set of one or more roles is allowed to read the entries in a specific database. Conversely, a deny list is a list of privileges that are denied for a specific set of one or more roles. For example, a deny list might specific that a certain role is not allowed to read the entries in a specific database. Both are used to control access to objects such as a database. Note that a privilege might be neither granted nor denied. This can be represented in both the grant and deny bit vectors with either both the grant and deny bits set to 0 or both the grant and deny bits set to 1.

If a particular privilege in the set of ACEs is "grant," then the grant bit associated with that privilege is 1 and the deny bit associated with that privilege is 0; if a particular privilege in the set of ACEs is "deny," then the grant bit associated with that privilege is 0 and the deny bit associated with that privilege is 1. If a particular privilege in the set of ACEs is "unknown," then the grant bit is 0 and the deny bit is 0. In another embodiment, if a particular privilege in the set of ACEs is "unknown," then the grant bit is 1 and the deny bit is 1. These grant bits are used to control access to objects based on the one or more roles. For example, a database might be associated with an ACE, which then specifies that a user with a specific role can read the contents of that database through a grant bit of 1 and a deny bit of 0 associated with a read privilege for that database. Different privileges are found in different positions of the bit vectors representing the grant and deny portions of an ACE.

Once the grant list bit vector and deny list bit vector are stored in the session-level cache, they can subsequently be retrieved from the session-level cache by using the set of roles as an index. Caching the grant list bit vector and the deny list bit vector enables efficient evaluation of the security policy because the parsing and generation from the XML document is not required if the grant list bit vector and the deny list bit vector already exists in the session-level cache.

Illustration of Different Roles

Figure 8A:
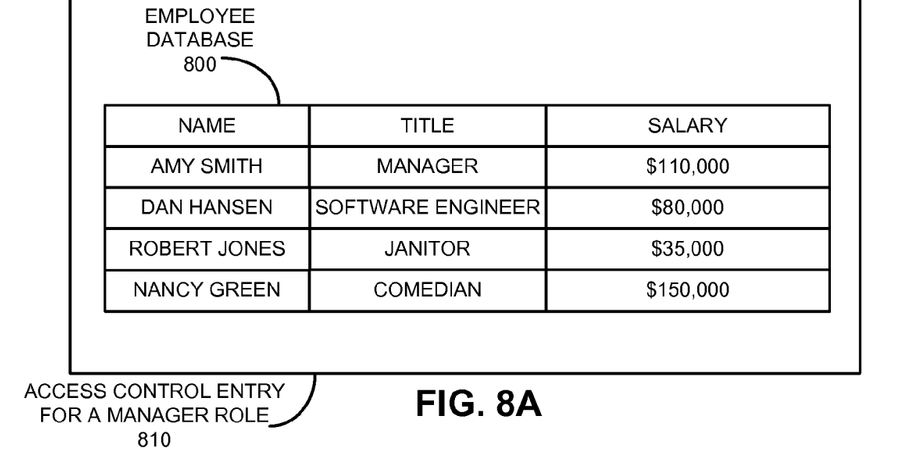
FIGS. 8A, 8B, and 8C illustrate ACEs for different roles in accordance with an embodiment of the present invention.
Figure 8B:
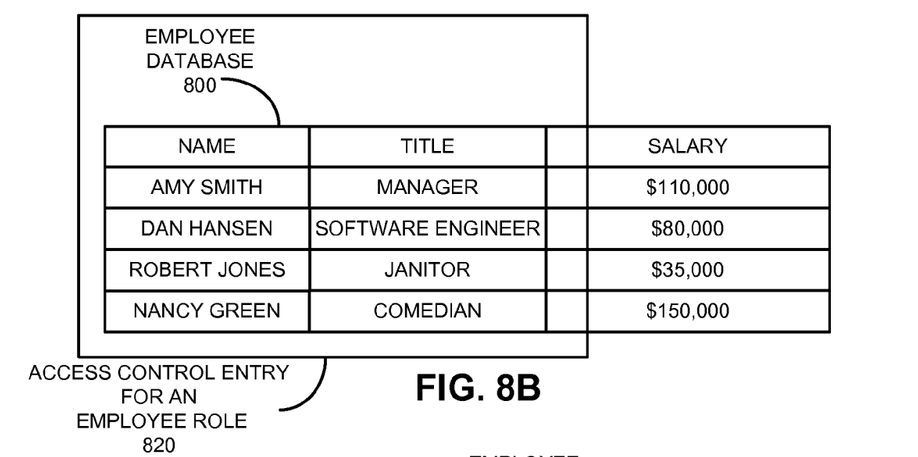
Figure 8C:
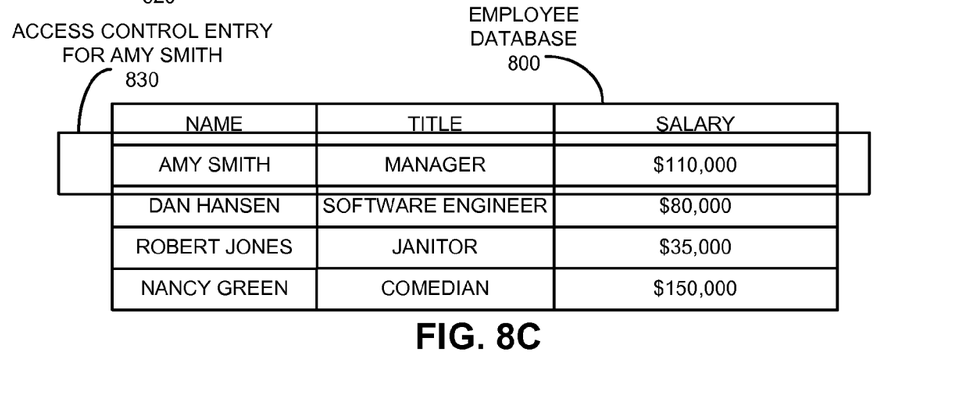

FIGS. 8A, 8B, and 8C illustrate ACEs for different roles in accordance with an embodiment of the present invention. These figures illustrate subsets of a database (employee database 800) and various ACEs and subjects in accordance with an embodiment of the present invention. For example, FIG. 8A illustrates an ACE for a manager role (data 810). Note that the manager might be allowed read access to all of the entries in the employee database. In contrast, FIG. 8B illustrates an ACE for an employee role (data 820), wherein employees are allowed read access only to the names and titles of employees and not their salaries. FIG. 8C illustrates an ACE for role "Amy Smith" (data 830), wherein "Amy Smith" is only allowed to read the row associated with "Amy Smith."

XML-Based Access Control Lists

Figure 9:
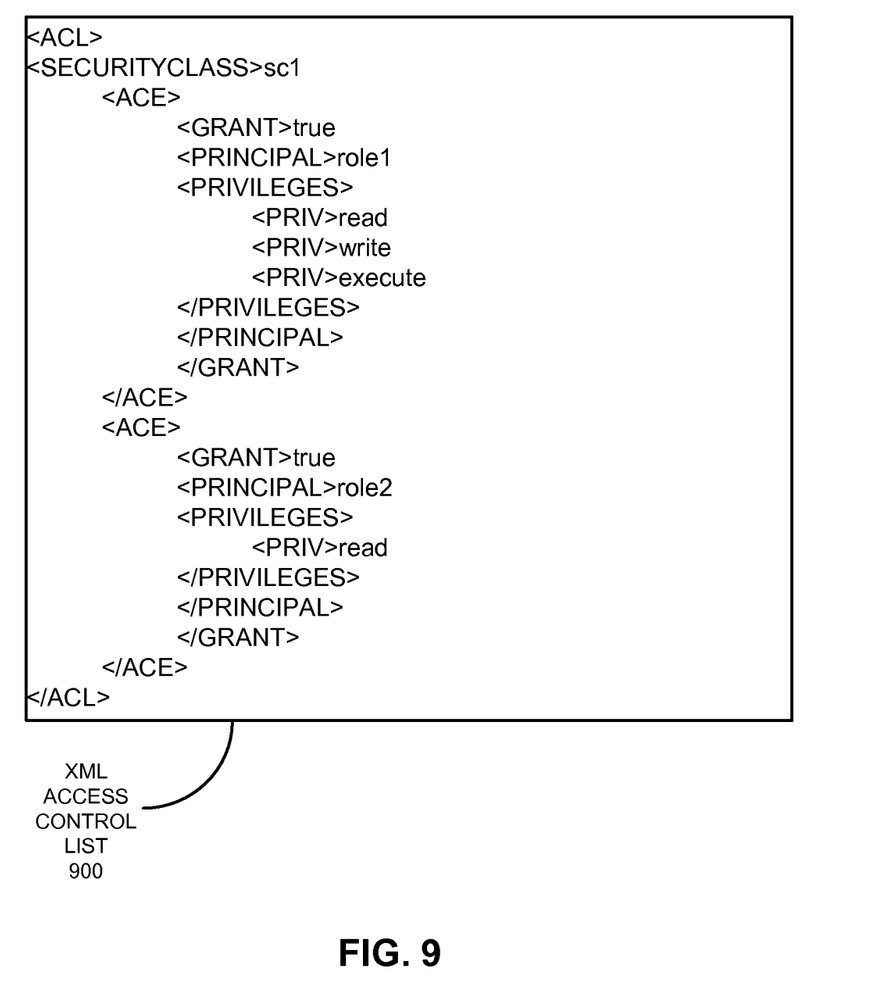
FIG. 9 illustrates an exemplary XML-based ACL in accordance with an embodiment of the present invention.

FIG. 9 illustrates an exemplary XML-based ACL (item 900) in accordance with an embodiment of the present invention. This ACL contains a set of ACEs organized by privileges and roles. For example, subject "role1" is allowed read, write, and execute privileges for the object associated with this ACL. Various XML-based techniques can be used to represent the same information. For example, the same information can be distributed in multiple XML documents. Note that an ACL can refer to a security class (e.g., sc1), which defines what privileges can be used in that ACL. In other words, an ACL can only grant or deny those privileges that are associated with the security class. A different security class can yield a different set of grant or deny privileges. Note that the indices for retrieving the ACEs from a session level cache and retrieving the XML document representing an ACL can include the security class. Similarly, updating the session-level cache can include the security class as n index.

Computer and Communication System

Figure 10:
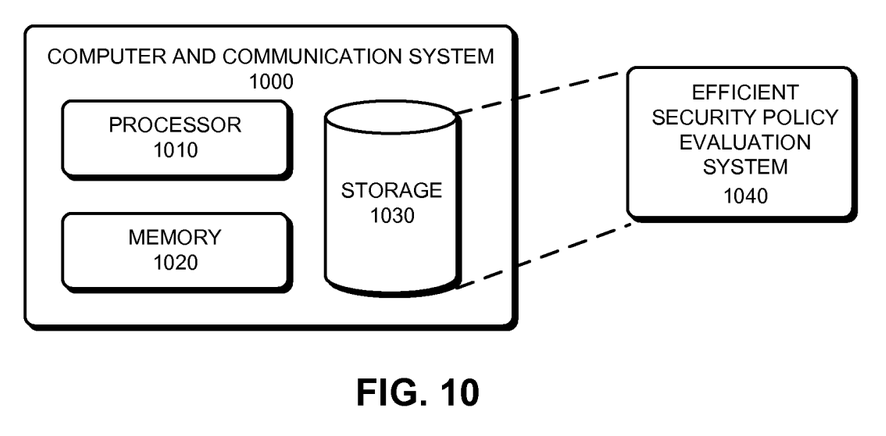
FIG. 10 presents an exemplary computer system for optimizing the CPU cost of security policy evaluation in accordance with an embodiment of the present invention.

FIG. 10 presents an exemplary computer system for efficiently evaluating a security policy in accordance with an embodiment of the present invention. In FIG. 10, a computer and communication system 1000 includes a processor 1010, a memory 1020, and a storage device 1030. Storage device 1030 stores programs to be executed by processor 1010. Specifically, storage device 1030 stores a program that implements a system for efficiently evaluating a security policy 1040. During operation, the program for optimizing the CPU cost of security policy evaluation 1040 is loaded from storage device 1030 into memory 1020 and is executed by processor 1010.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executed method for efficiently evaluating a security policy, comprising:
   starting a session for a user;
   identifying a first role associated with the user;
   determining that a cached entry specific to the user does not exist in a session-level cache, wherein the cached entry corresponds to a set of access control entries (ACEs) that is in compliance with the first role;
   a first set of ACEs associated with the first role for the user from an access control list (ACL); and
   storing the generated first set of ACEs as the cached entry in the session-level cache, by storing a grant bit vector that indicates privileges granted to the first role and a deny bit vector that indicates privileges denied to the first role, wherein a grant bit in the grant bit vector and a corresponding deny bit in the deny bit vector jointly indicate whether an associated privilege is granted, denied, or undetermined, and wherein when the associated privilege is undetermined, the corresponding grant bit and deny bit are both "1" or "0;"
   associating the user with a second role;
   generating a second set of ACEs based on the second role; and
   updating the session-level cache by storing the second set of ACEs;
   wherein associating the user with the second role comprises at least on of:
      allowing a system administrator change the first role, having a process temporarily enable the second role, and having the first role expire because of a time limit.

2. The method of claim 1, wherein identifying the first role associated with the user comprises retrieving a directed acyclic graph of roles associated with the user.

3. The method of claim 1, wherein generating the first set of ACEs associated with the first role for the user from the ACL comprises:
   retrieving an XML document representing the ACL;
   parsing the retrieved XML document; and
   generating the first set of ACEs from the parsed XML document.

4. The method of claim 3, wherein generating the first set of ACEs from the parsed XML document comprises:
   generating a set of privileges that are granted and associated with the first role from the parsed XML document; and
   generating a set of privileges that are denied and associated with the first role from the parsed XML document.

5. The method of claim 1, wherein updating the cached entry further comprises:
   deleting the first set of ACEs.

6. A computer system for evaluating a security policy, comprising a micro-processor, a memory, and a storage storing instructions which when executed by the micro-processor causes the micro-processor to perform a method, the method comprising:
   retrieving a first role associated with a user;
   determining whether a cached entry specific to the user exists in a session-level cache, wherein the cached entry corresponds to a set of access control entries (ACEs) that is in compliance with the first role;
   in response to the cached entry not being in the session-level cache, generating a first set of ACEs associated with the first role for the user from an access control list (ACL);
   storing the generated first set of ACEs as the cached entry, by storing a grant bit vector that indicates privileges granted to the first role and a deny bit vector that indicates privileges denied to the first role associated with the first set of ACEs, wherein a grant bit in the grant bit vector and a corresponding deny bit in the deny bit vector jointly indicate whether an associated privilege is granted, denied, or undetermined, and wherein when the associated privilege is undetermined, the corresponding grant bit and deny bit are both "1" or "0;"
   associating the user with a second role;
   generating a second set of ACEs based on the second role; and
   updating the session-level cache by storing the second set of ACEs;
   wherein associating the user with the second role comprises at least on of:
      allowing a system administrator change the first role, having a process temporarily enable the second role, and having the first role expire because of a time limit.

7. The computer system of claim 6, wherein retrieving the first role associated with the user, comprises retrieving a directed acyclic graph of roles associated with the user.

8. The computer system of claim 6, wherein generating the first set of ACEs associated with the first role for the user from the ACL, comprises:
   retrieving an XML document representing the ACL;
   parsing the retrieved XML document; and
   generating the first set of ACEs from the parsed XML document.

9. The computer system of claim 8, wherein generating the first set of ACEs from the parsed XML document comprises:
   generating a set of privileges that are granted and associated with the first role from the parsed XML document; and
   generating a set of privileges that are denied and associated with the first role from the parsed XML document.

10. The computer system of claim 6, wherein generating the second set of ACEs comprises deleting the first set of ACEs.

11. A non-transitory computer-readable storage device storing instructions that when executed by a computer cause the computer to perform a method for optimizing CPU cost of security policy evaluation, the method comprising:
   starting a session for a user;
   identifying a first role associated with the user;
   determining that a cached entry specific to the user exists in a session-level cache, wherein the cached entry corresponds to a set of access control entries (ACEs) that is in compliance with the first role;
   generating a first set of ACEs associated with the first role for the user from an access control list (ACL); and
   storing the generated first set of ACEs as the cached entry in the session-level cache, by storing a grant bit vector that indicates privileges granted to the first role and a deny bit vector that indicates privileges denied to the first role wherein a grant bit in the grant bit vector and a corresponding deny bit in the deny bit vector jointly indicate whether an associated privilege is granted, denied, or undetermined, and wherein when the associated privilege is undetermined, the corresponding grant bit and deny bit are both "1" or "0;"
   associating the user with a second role;
   generating a second set of ACEs based on the second role; and
   updating the session-level cache by storing the second set of ACEs;

wherein associating the user with the second role comprises at least on of:
allowing a system administrator change the first role, having a process temporarily enable the second role, and having the first role expire because of a time limit.

12. The storage device of claim 11, wherein identifying the first role associated with the user comprises retrieving a directed acyclic graph of roles associated with the user.

13. The storage device of claim 11, wherein generating the first set of ACEs associated with the first role for the user from the ACL comprises:
retrieving an XML document representing the ACL;
parsing the retrieved XML document; and
generating the first set of ACEs from the parsed XML document.

14. The storage device of claim 13, wherein generating the first set of ACEs from the parsed XML document comprises:
generating a set of privileges that are granted and associated with the first role from the parsed XML document; and
generating a set of privileges that are denied and associated with the first role from the parsed XML document.

15. The storage device of claim 11, wherein updating the cached entry comprises:
deleting the first set of ACEs.

* * * * *

UNITED STATES PATENT AND TRADEMARK OFFICE
CERTIFICATE OF CORRECTION

PATENT NO. : 8,584,196 B2  Page 1 of 1
APPLICATION NO. : 12/114915
DATED : November 12, 2013
INVENTOR(S) : Rafiq et al.

It is certified that error appears in the above-identified patent and that said Letters Patent is hereby corrected as shown below:

In the specification

In column 3, line 8, delete "her self." and insert -- herself. --, therefor.

In column 4, line 5, delete "session" and insert -- session. --, therefor.

In the claims

In column 7, line 10, in Claim 1, delete "a" and insert -- generating a --, therefor.

In column 7, line 28, in Claim 1, delete "on" and insert -- one --, therefor.

In column 7, line 66, in Claim 6, delete "entry," and insert -- entry --, therefor.

In column 8, line 2-3, in Claim 6, delete "role associated with the first set of ACEs," and insert -- role, --, therefor.

In column 8, line 16, in Claim 6, delete "on" and insert -- one --, therefor.

In column 8, line 53, in Claim 11, delete "cache," and insert -- cache --, therefor.

In column 9, line 2, in Claim 11, delete "on" and insert -- one --, therefor.

Signed and Sealed this
Fifth Day of January, 2016

Michelle K. Lee
*Director of the United States Patent and Trademark Office*